(12) United States Patent
Du et al.

(10) Patent No.: US 10,788,944 B2
(45) Date of Patent: Sep. 29, 2020

(54) TOUCH DISPLAY PANEL, METHOD OF MANUFACTURING TOUCH DISPLAY PANEL, AND DISPLAY APPARATUS

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Fangzhi Du, Beijing (CN); Ruitao Song, Beijing (CN); Gongping Zhao, Beijing (CN); Qingchao Meng, Beijing (CN)

(73) Assignees: HEFEI XINSHENG OPTOELECTRONICS TECHNOLOGY CO., LTD., Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/389,307

(22) Filed: Apr. 19, 2019

(65) Prior Publication Data
US 2020/0104012 A1  Apr. 2, 2020

(30) Foreign Application Priority Data
Sep. 27, 2018  (CN) .......................... 2018 1 1166664

(51) Int. Cl.
*G06F 3/044*  (2006.01)

(52) U.S. Cl.
CPC .. *G06F 3/0445* (2019.05); *G06F 2203/04103* (2013.01)

(58) Field of Classification Search
CPC ......... G06F 3/0445; G06F 2203/04103; G06F 2203/04111; G06F 2203/04112; G06F 2203/04113
See application file for complete search history.

(56) References Cited

U.S. PATENT DOCUMENTS

| 2009/0262094 A1* | 10/2009 | Lin ......................... G06F 3/045 345/174 |
| 2015/0301659 A1* | 10/2015 | Umemoto ............ H05K 1/0393 345/174 |
| 2017/0031501 A1* | 2/2017 | Lee ........................ G06F 3/044 |
| 2017/0123533 A1* | 5/2017 | Jo ........................... G06F 3/041 |

* cited by examiner

*Primary Examiner* — Kevin M Nguyen
(74) *Attorney, Agent, or Firm* — Kinney & Lange, P.A.

(57) ABSTRACT

A touch display panel, a method of manufacturing the touch display panel, and a display apparatus with the touch display panel are disclosed. The touch display panel includes: a substrate; a plurality of first electrically conducting wires disposed over the substrate; and a first point pattern which is connected to at least one of the plurality of first electrically conducting wires, has a point facing outwards, and is configured to discharge a static electricity on the at least one of the plurality of first electrically conducting wires by a point discharge.

18 Claims, 8 Drawing Sheets

TOUCH DISPLAY PANEL, METHOD OF MANUFACTURING TOUCH DISPLAY PANEL, AND DISPLAY APPARATUS

CROSS-REFERENCE TO RELATED APPLICATION

This application claims the benefit of Chinese Patent Application No. 201811166664.X, filed with the State Intellectual Property Office of China on Sep. 27, 2018, the whole disclosure of which is incorporated herein by reference.

TECHNICAL FIELD

Embodiments of the present disclosure relate to a touch display panel, a method of manufacturing the touch display panel, and a display apparatus with the touch display panel.

BACKGROUND

A conventional touch display apparatus, especially a large-size OGS (One Glass Solution) touch display panel, has a lower yield due to an electrostatic discharge (ESD) and an uncertain electrostatic discharge position in a manufacturing process.

SUMMARY

Embodiments of the present disclosure provide a touch display panel comprising: a substrate; a plurality of first electrically conducting wires disposed over the substrate; and a first point pattern which is connected to at least one of the plurality of first electrically conducting wires, has a point facing outwards, and is configured to discharge a static electricity on the at least one of the plurality of first electrically conducting wires by a point discharge.

According to embodiments of the present disclosure, the touch display panel comprises a plurality of the first point patterns, two of the plurality of first point patterns are connected to both sides of each of the plurality of first electrically conducting wires, respectively, and all of points of the plurality of first point patterns are located on a first straight line perpendicular to a direction in which the plurality of first electrically conducting wires extend.

According to embodiments of the present disclosure, the touch display panel further comprises: a first protective layer covering the plurality of first electrically conducting wires and formed with a plurality of first holes, wherein an orthogonal projection of each of the plurality of first holes on the substrate at least partially overlaps an orthogonal projection of two adjacent ones of the plurality of first point patterns between two adjacent ones of the plurality of first electrically conducting wires on the substrate, or an orthogonal projection of a connection part between the two adjacent first point patterns on the substrate.

According to embodiments of the present disclosure, the touch display panel further comprises: a plurality of second electrically conducting wires disposed over the substrate; a second protective layer covering the plurality of second electrically conducting wires, wherein the plurality of first electrically conducting wires and the plurality of second electrically conducting wires are located on both sides of the second protective layer, respectively, and the plurality of second electrically conducting wires cross the plurality of first electrically conducting wires; and a second point pattern which is connected to at least one of the plurality of second electrically conducting wires, has a point facing outwards, and is configured to discharge a static electricity on the at least one of the plurality of second electrically conducting wires by a point discharge.

According to embodiments of the present disclosure, the touch display panel comprises a plurality of the second point patterns, two of the plurality of second point patterns are connected to both sides of each of the plurality of second electrically conducting wires, respectively, and all of points of the plurality of second point patterns are located on a second straight line perpendicular to a direction in which the plurality of second electrically conducting wires extend.

According to embodiments of the present disclosure, the second protective layer is formed with a plurality of second holes, an orthogonal projection of each of the plurality of second holes on the substrate at least partially overlaps an orthogonal projection of two adjacent ones of the plurality of second point patterns between two adjacent ones of the plurality of second electrically conducting wires on the substrate, or an orthogonal projection of a connection part between the two adjacent second point patterns on the substrate.

According to embodiments of the present disclosure, each of the plurality of first electrically conducting wires comprises a bonding end, a connection portion connected with the bonding end, a body perpendicular to the connection portion, and a bent portion connecting the connection portion and the body, and the plurality of first point patterns are connected to ends of the body adjacent to the bonding ends.

According to embodiments of the present disclosure, each of the plurality of first point patterns has a triangular shape.

According to embodiments of the present disclosure, each of the plurality of second point patterns has a triangular shape.

According to embodiments of the present disclosure, each of the plurality of first electrically conducting wires comprises a bonding end, a connection portion connected with the bonding end, a body perpendicular to the connection portion, and a bent portion connecting the connection portion and the body, and the plurality of first point patterns are connected to ends of the body adjacent to the bonding ends, and the plurality of first holes comprise rectangular holes each having a pair of side walls parallel to the bodies.

According to embodiments of the present disclosure, the touch display panel further comprises: a light blocking film disposed over the substrate and located on a side of the plurality of second electrically conducting wires facing away from the second protective layer.

Embodiments of the present disclosure further provide a method of manufacturing the above touch display panel, the method comprising: forming a first electrically conducting layer over the substrate; and patterning the first electrically conducting layer to form the plurality of first electrically conducting wires and the first point pattern which is connected to the at least one of the plurality of first electrically conducting wires and has the point facing outwards.

According to embodiments of the present disclosure, the method further comprises: forming a first protective layer, which covers the plurality of first electrically conducting wires, and a plurality of first holes in the first protective layer; and etching away two adjacent ones of the plurality of first point patterns between two adjacent ones of the plurality of first electrically conducting wires, or a connection part between the two adjacent first point patterns through each of the plurality of first holes.

According to embodiments of the present disclosure, the method further comprises: prior to forming the first electrically conducting layer over the substrate, forming a second electrically conducting layer over the substrate, and patterning the second electrically conducting layer to form a plurality of second electrically conducting wires and a second point pattern which is connected to at least one of the plurality of second electrically conducting wires and has a point facing outwards.

According to embodiments of the present disclosure, the method further comprises: forming a second protective layer, which covers the plurality of second electrically conducting wires, and a plurality of second holes in the second protective layer; and etching away two adjacent ones of the plurality of second point patterns between two adjacent ones of the plurality of second electrically conducting wires, or a connection part between the two adjacent second point patterns through each of the plurality of second holes, wherein forming the first electrically conducting layer over the substrate comprises: forming the first electrically conducting layer over the second protective layer.

According to embodiments of the present disclosure, the method further comprises: forming a light blocking film over the substrate prior to forming the second electrically conducting layer over the substrate, wherein forming the second electrically conducting layer over the substrate comprises: forming the second electrically conducting layer over the light blocking film.

According to embodiments of the present disclosure, forming the first protective layer, which covers the plurality of first electrically conducting wires, and the plurality of first holes in the first protective layer comprises: applying a first protective layer material; and exposing the applied first protective layer material while discharging the static electricity on the at least one of the plurality of first electrically conducting wires by the point discharge by the first point pattern, thereby forming the first protective layer and the plurality of first holes in the first protective layer.

According to embodiments of the present disclosure, forming the second protective layer, which covers the plurality of second electrically conducting wires, and the plurality of second holes in the second protective layer comprises: applying a second protective layer material; and exposing the applied second protective layer material while discharging the static electricity on the at least one of the plurality of second electrically conducting wires by a point discharge by the second point pattern, thereby forming the second protective layer and the plurality of second holes in the second protective layer.

According to embodiments of the present disclosure, each of the plurality of first electrically conducting wires comprises a bonding end, a connection portion connected with the bonding end, a body perpendicular to the connection portion, and a bent portion connecting the connection portion and the body, and the plurality of first point patterns are connected to ends of the body adjacent to the bonding ends, and the plurality of first holes comprise rectangular holes each having a pair of side walls parallel to the bodies.

Embodiments of the present disclosure further provide a display apparatus comprising the above touch display panel.

BRIEF DESCRIPTION OF THE DRAWINGS

In order to describe embodiments of the present disclosure or technical solutions in the prior art more clearly, accompanying drawings required for describing the embodiments or the prior art will be simply explained as below. Apparently, the accompanying drawings for the following description are only some embodiments of the present disclosure. Those skilled in the art also could derive other accompanying drawings from these accompanying drawings without making a creative work.

DETAILED DESCRIPTION

A clear and complete description of technical solutions in embodiments of the present disclosure will be made as below in conjunction with the accompanying drawings in the embodiments of the present disclosure. Apparently, the described embodiments are some of the embodiments of the present disclosure rather than all of the embodiments of the present disclosure. All other embodiments derived by those skilled in the art based on the embodiments of the present disclosure without making a creative work shall fall within the protection scope of the present disclosure.

Figure 1:
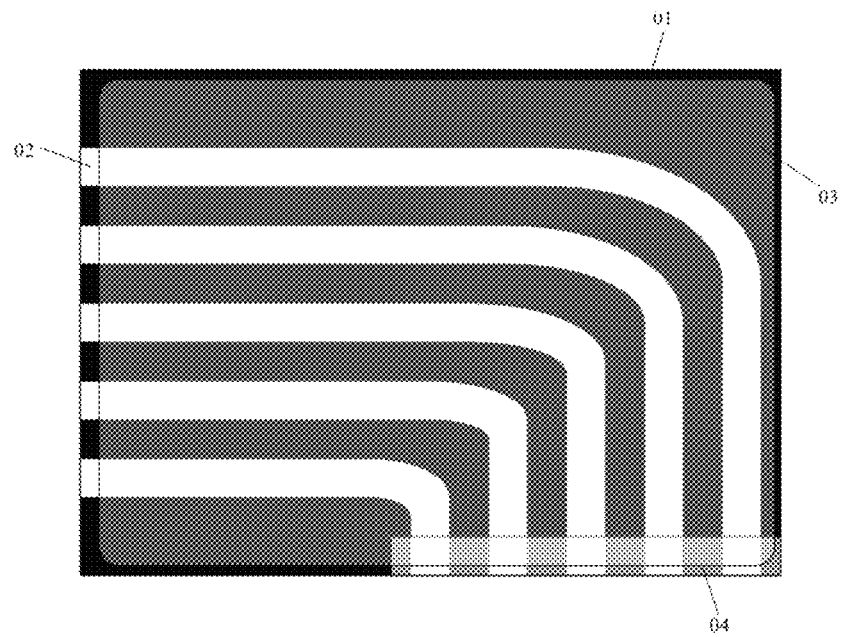
FIG. 1 is a schematic view showing a structure of a touch display panel in a related art.

In a related art, generally, a touch display panel has a structure as shown in FIG. 1. The touch display panel includes: a substrate; a light blocking film 01 disposed on the substrate; a plurality of electrically conducting wires 02 disposed on the light blocking film 01; and a protective layer 03 covering the plurality of electrically conducting wires 02. The touch display panel further includes a bonding region 04 for bonding an external circuit board. In a process of manufacturing the protective layer 03, when a protective layer material is exposed subsequent to an application of the protective layer material, an electrostatic discharge is liable to occur on the electrically conducting wires 02 under the protective layer 03 and the electrostatic discharge may take place at any position on the electrically conducting wires 02. As a result, other structures of the touch display panel are easily adversely affected, resulting in a low yield of the touch display panel.

Embodiments of the present disclosure provide a touch display panel. As shown in FIGS. 2-6, the touch display panel includes: a substrate 11; a plurality of first electrically conducting wires 12 disposed over the substrate 11; and a first point pattern 13 which is connected to at least one of the plurality of first electrically conducting wires 12, has a point 131 facing outwards, and is configured to discharge a static electricity on the at least one of the plurality of first electrically conducting wires 12 by a point discharge.

In the embodiments of the present disclosure, a specific shape of the first point pattern 13 is not limited as long as the first point pattern 13 has the point 131 by means of which the point discharge can take place. For example, the first point pattern 13 may be a triangular pattern as shown in FIG. 2, or may also be an arc-shaped pattern having a point, or the like.

In this way, in the touch display panel according to the embodiments of the present disclosure, the first point pattern is connected to the first electrically conducting wire such that the electrostatic discharge of the first electrically conducting wire is achieved by the point discharge of the first point pattern. Since the first point pattern is fixed in position, the electrostatic discharge of the first electrically conducting wire will take place at a fixed position, avoiding an adverse influence of the electrostatic discharge at a random position on a key structure of the touch display panel, and thus increasing a yield of the touch display panel.

Figure 2:
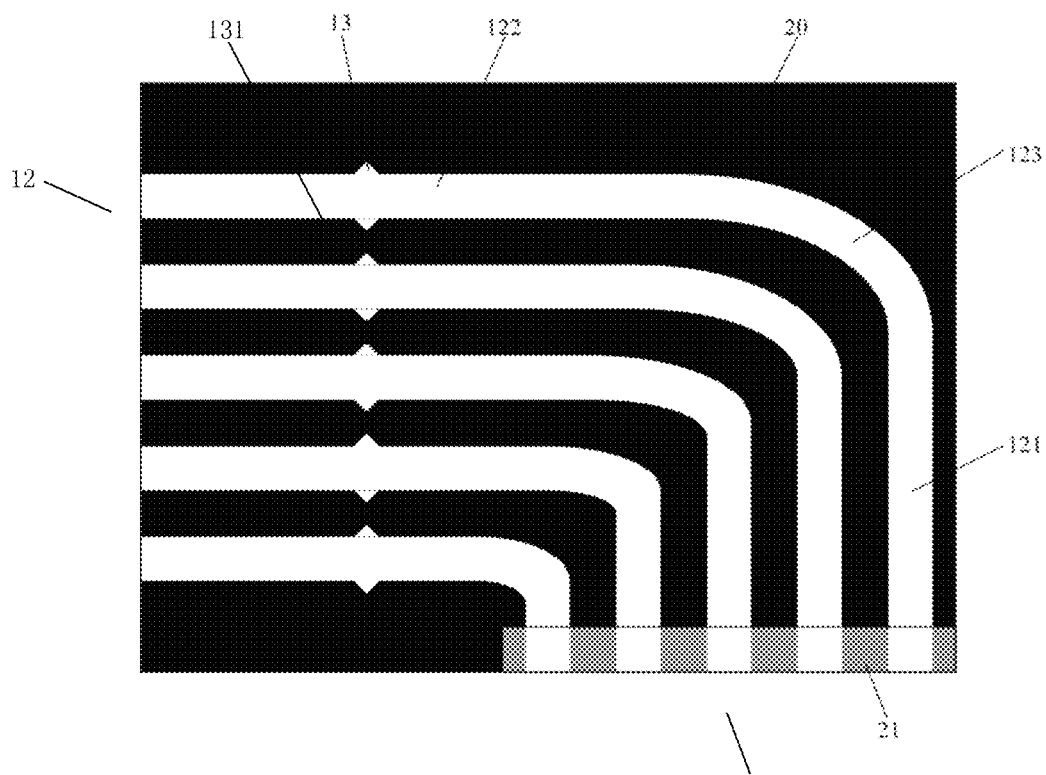
FIG. 2 is a schematic view showing a structure of a touch display panel according to an embodiment of the present disclosure.

In some embodiments of the present disclosure, referring to FIG. 2, each of the plurality of first electrically conducting wires 12 includes: a bonding end 120, a connection portion 121 connected with the bonding end 120, a body 122 perpendicular to the connection portion 121, and a bent portion 123 connecting the connection portion 121 and the body 122, and the plurality of first point patterns 13 are connected to ends of the bodies 122 adjacent to the bonding ends 120. In the embodiments, the bonding end 120 of the first electrically conducting wire 12 is an end thereof in the bonding region 21.

Since the static electricity may enter the first electrically conducting wires 12 from a side on which the bonding region 21 is located, the first point pattern 13 is disposed adjacent to the bonding region 21, so that the static electricity on the first electrically conducting wires 12 can be discharged in time, preventing an adverse influence of the static electricity on other structures of the touch display panel.

Figure 3:
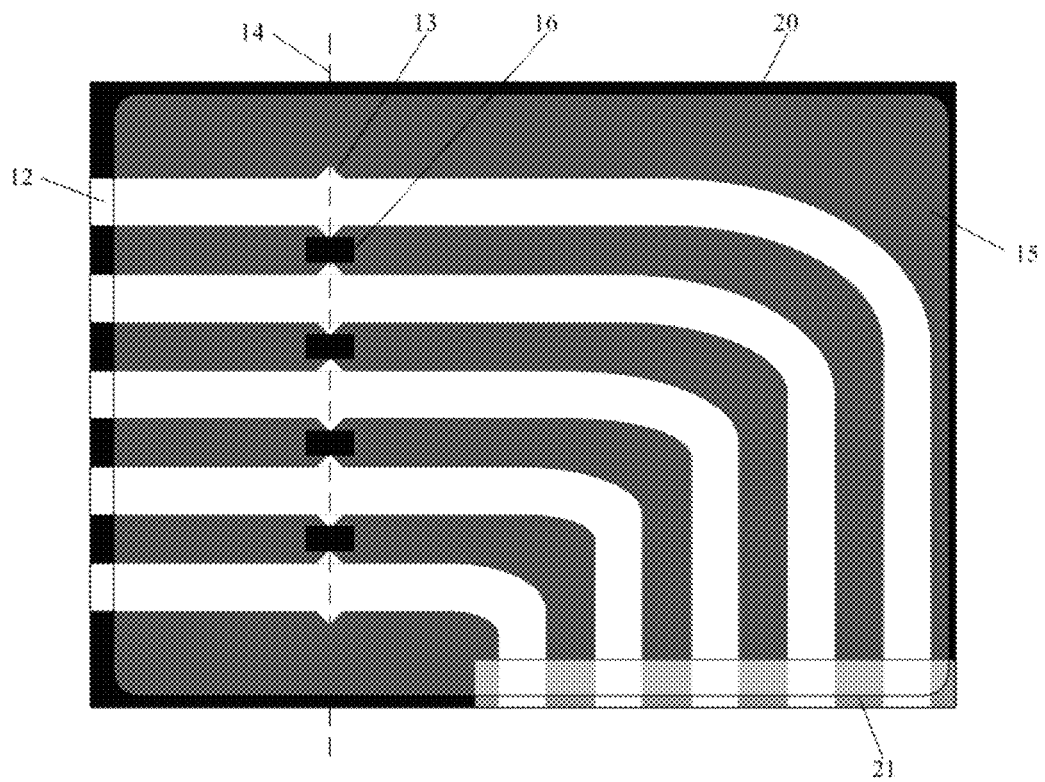
FIG. 3 is a schematic view showing a structure of a touch display panel according to another embodiment of the present disclosure.
Figure 4:
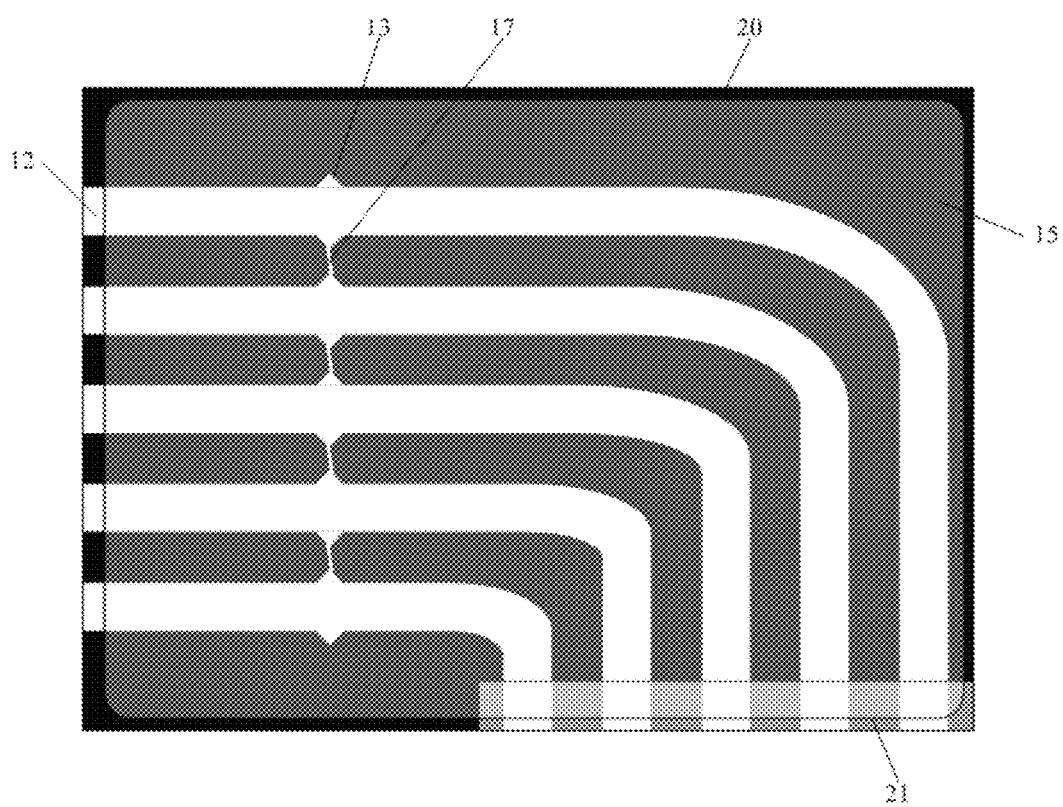
FIG. 4 is a schematic view showing a structure of a touch display panel according to still another embodiment of the present disclosure.

In some embodiments of the present disclosure, referring to FIGS. 2-4, the touch display panel includes a plurality of first point patterns 13, two of the plurality of first point patterns 13 are connected to both sides of each of the plurality of first electrically conducting wires 12, respectively, and all of points 131 of the plurality of first point patterns 13 are located on a first straight line 14 perpendicular to a direction in which the plurality of first electrically conducting wires 12 or the bodies 122 of the plurality of first electrically conducting wires 12 extend.

In some embodiments of the present disclosure, referring to FIGS. 2-4, the touch display panel further includes a first protective layer 15 covering the plurality of first electrically conducting wires 12 and formed with a plurality of first holes 16. An orthogonal projection of each of the plurality of first holes 16 on the substrate 11 at least partially overlaps an orthogonal projection of two adjacent ones of the plurality of first point patterns 13 between two adjacent ones of the plurality of first electrically conducting wires on the substrate 11, or an orthogonal projection of a connection part 17 between the two adjacent first point patterns 13 on the substrate 11. The two adjacent first point patterns 13, or the connection part 17 between the two adjacent first point patterns 13 can be etched away by an etching solution through each of the plurality of first holes 16. According to some embodiments of the present disclosure, the first protective layer 15 may be made of an organic insulating material.

In embodiments of the present disclosure, all of the points 131 of the plurality of first point patterns 13 are located on the first straight line 14, so that the electrostatic discharges of the plurality of first electrically conducting wires 12 can take place at concentrated positions. In addition, the first protective layer 15 may be manufactured by applying, exposing, cleaning, and drying steps. In a process of exposing the first protective layer 15, the electrostatic discharge is liable to take place so as to generate a high voltage which may deforms the first point patterns 13 connected to the first electrically conducting wires 12. According to the embodiment, all of the points 131 of the plurality of first point patterns 13 are located on the first straight line 14, thereby facilitating the points 131 of the adjacent deformed first point patterns 13 to be connected to each other as shown in FIG. 4. In this way, the structures connected to the plurality of first electrically conducting wires 12 for the electrostatic discharge are integrated and thus are more favorable to the electrostatic discharge of the first electrically conducting wires 12. It is to be noted that when the first electrically conducting wires 12 and the first point patterns 13 are manufactured, points 131 of two adjacent ones of the first point patterns 13 may be connected to each other or may not be connected to each other. It is not limited in the embodiments of the present disclosure whether or not the points 131 of the two adjacent ones of the first point patterns 13 are connected to each other.

However, when the touch display panel is in use, each of the plurality of first electrically conducting wires 12 is configured to transmit a signal. Therefore, the plurality of first electrically conducting wires 12 cannot be interconnected to one another. Therefore, when the first protective layer 15 is manufactured, the first holes 16 are formed in the first protective layer 15 at positions corresponding to the first point patterns 13. In other words, an orthogonal projection of each of the plurality of first holes 16 on the substrate 11 at least partially overlaps an orthogonal projection of two adjacent ones of the plurality of first point patterns 13 between two adjacent ones of the plurality of first electrically conducting wires on the substrate 11, or at least partially overlaps an orthogonal projection of a connection part 17 between the two adjacent first point patterns 13 on the substrate 11. In this case, after the first protective layer 15 is manufactured, an etching step may be added. In the etching step, the connection part 17 between the two adjacent first point patterns 13 is etched away or the two adjacent first point patterns 13 are also directly etched away completely, by an etching solution through each of the plurality of first holes 16. Thereby, the two adjacent first electrically conducting wires 12 are prevented from being electrically connected to each other to ensure a normal operation of the first electrically conducting wires 12.

In the embodiments of the present disclosure, a specific shape of the first hole 16 is not limited. For example, the first hole 16 may be a circular hole, a rectangular hole, or the like. According to some embodiments of the present disclosure, the first hole 16 may be the rectangular hole. In order that two adjacent first point patterns 13, or the connection part 17 between the two adjacent first point patterns 13 can be better etched away by the etching solution through each of the rectangular holes, and the rectangular holes may each have a pair of side walls parallel to the bodies 122 of the first electrically conducting wires 12.

In some embodiments of the present disclosure, referring to FIGS. 5-8 and 11-14, the touch display panel further includes a plurality of second electrically conducting wires 18 disposed over the substrate 11; a second protective layer 19 covering the plurality of second electrically conducting wires 18, the plurality of first electrically conducting wires 12 and the plurality of second electrically conducting wires 18 being located on two opposite sides of the second protective layer 19, respectively (referring to FIG. 11); and a second point pattern 23 which is connected to at least one of the plurality of second electrically conducting wires 18, has a point 231 facing outwards (referring to FIGS. 5, 12 and 14), and is configured to discharge a static electricity on the at least one of the plurality of second electrically conducting wires 18 by a point discharge.

Figure 5:
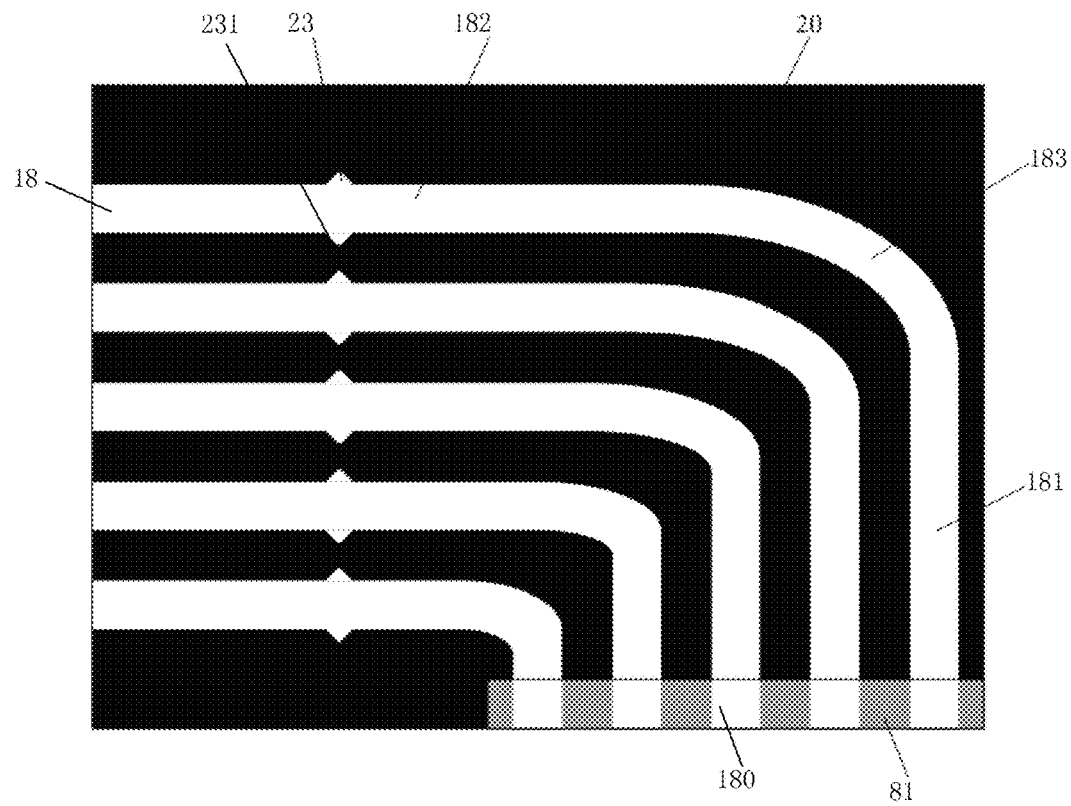
FIG. 5 is a schematic view showing a structure of a touch display panel according to yet another embodiment of the present disclosure.
Figure 12:
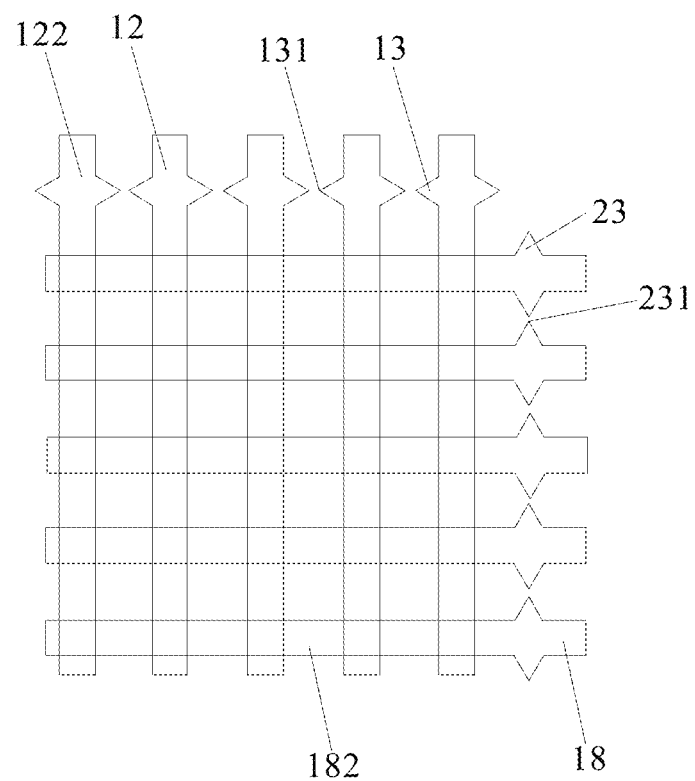
FIG. 12 is a top view of the touch display panel shown in FIG. 11, in which only bodies of a plurality of first electrically conducting wires and bodies of a plurality of second electrically conducting wires are shown.
Figure 13:
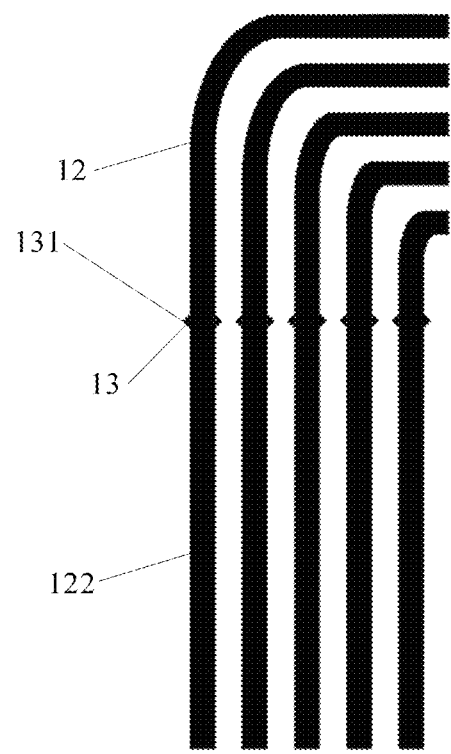
FIG. 13 is a top view of the touch display panel shown in FIG. 11, in which only the plurality of first electrically conducting wires are shown.
Figure 14:
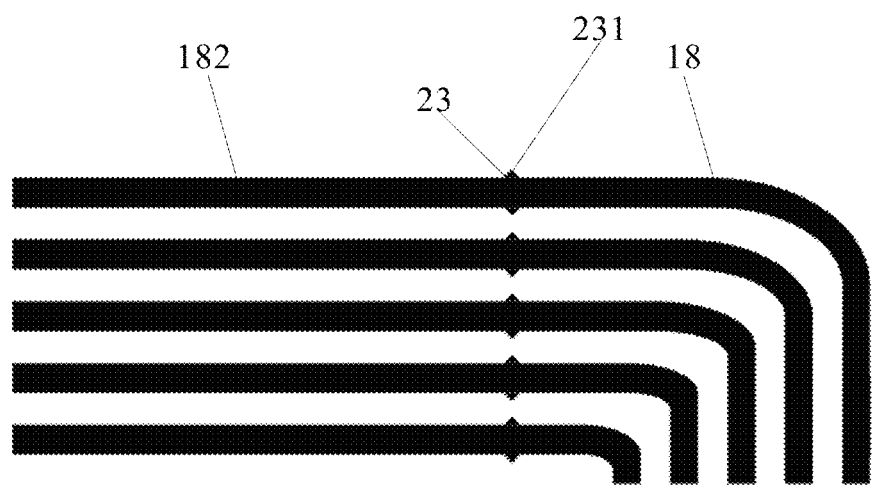
FIG. 14 is a top view of the touch display panel shown in FIG. 11, in which only the plurality of second electrically conducting wires are shown.

In some embodiments of the present disclosure, referring to FIG. 5, each of the plurality of second electrically conducting wires 18 includes: a bonding end 180, a connection portion 181 connected with the bonding end 180, a body 182 perpendicular to the connection portion 181, and a bent portion 183 connecting the connection portion 181 and the body 182, and the plurality of second point patterns 23 are connected to ends of the bodies 182 adjacent to the bonding ends 180. In the embodiments, the bonding end 180 of the second electrically conducting wire 18 is an end thereof in the bonding region 81. Referring to FIG. 12, the bodies 182 of the plurality of second electrically conducting wires 18 cross the bodies 122 of the plurality of first electrically conducting wires 12.

As the second point pattern 23 is connected to the second electrically conducting wire 18, the electrostatic discharge of the second electrically conducting wire 18 can be achieved by the point discharge of the second point pattern 23. In the embodiments of the present disclosure, a specific shape of the second point pattern 23 is not limited. For example, the second point pattern 23 may be a triangular pattern, or an arc-shaped pattern having a point. According to some embodiments of the present disclosure, the second point pattern 23 may have the same shape as the first point pattern 13 or a different shape from the first point pattern 13. It is not limited in the embodiments of the present disclosure whether or not the second point pattern 23 has the same shape as the first point pattern 13 or a different shape from the first point pattern 13.

Figure 6:
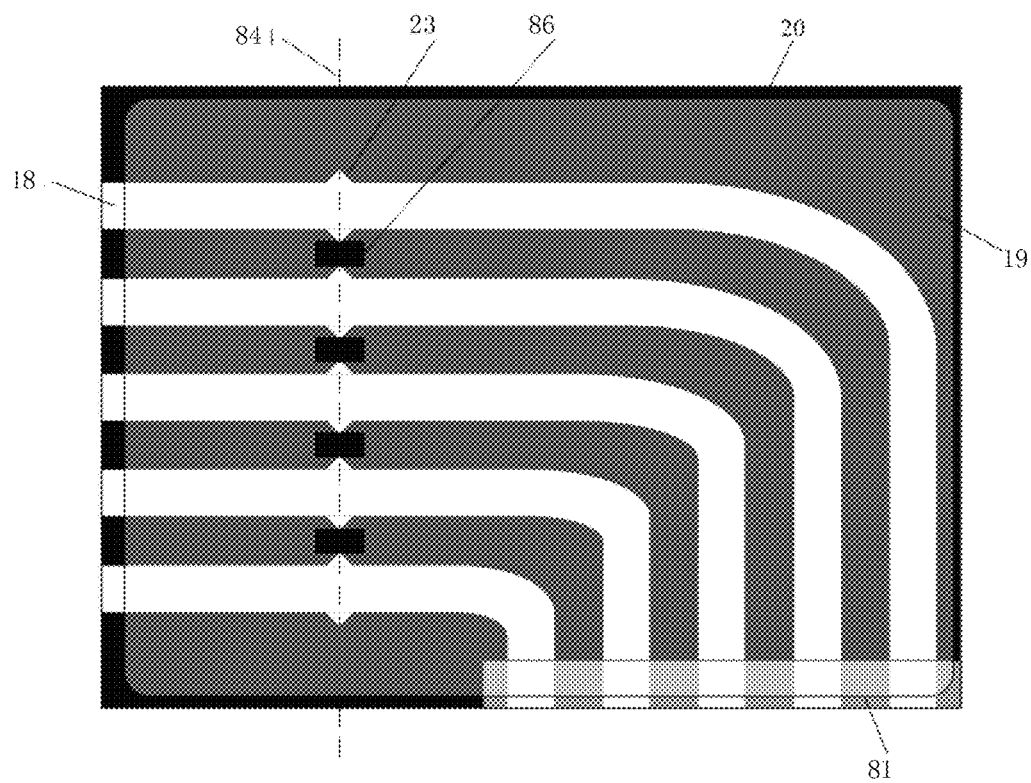
FIG. 6 is a schematic view showing a structure of a touch display panel according to a further embodiment of the present disclosure.
Figure 7:
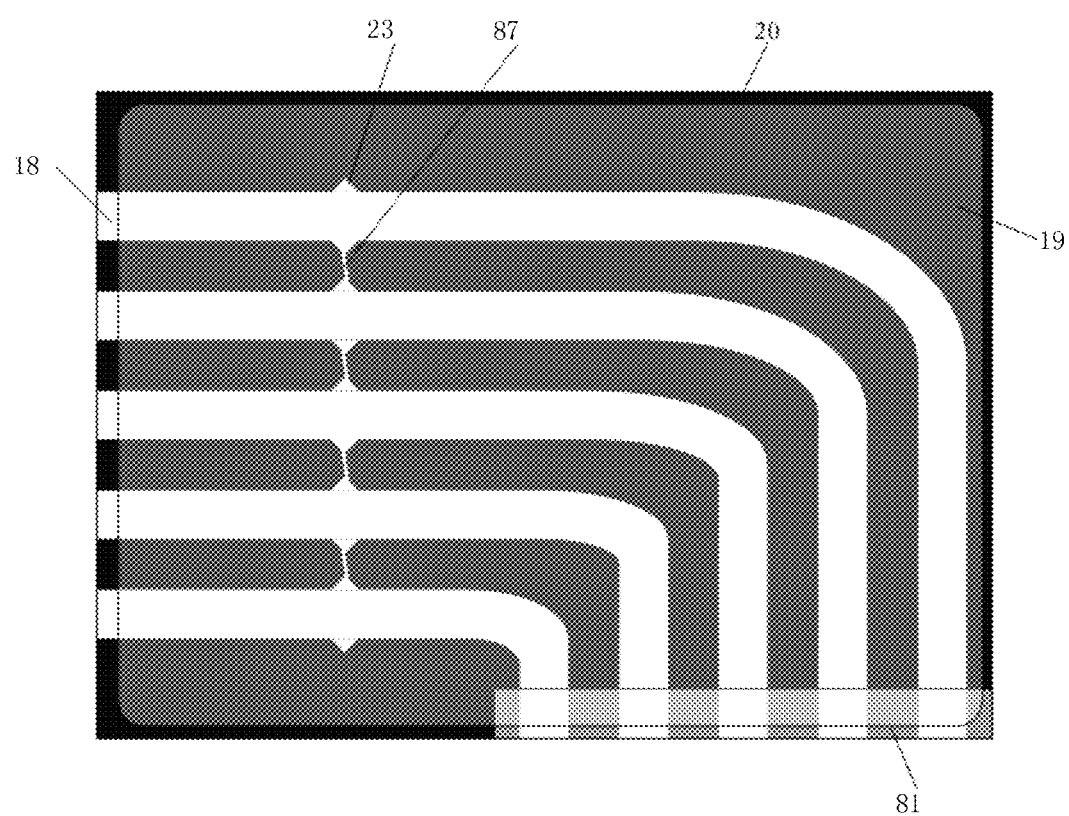
FIG. 7 is a schematic view showing a structure of a touch display panel according to a still further embodiment of the present disclosure.
Figure 8:
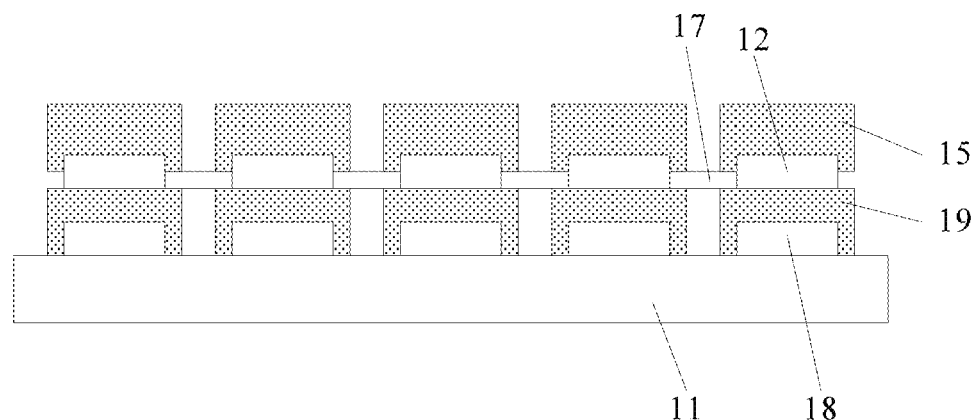
FIG. 8 is a schematic sectional view showing a structure of a touch display panel according to an embodiment of the present disclosure.

In some embodiments of the present disclosure, referring to FIGS. 6 to 7, the touch display panel includes a plurality of second point patterns 23, two of the plurality of second point patterns 23 are connected to both sides of each of the plurality of second electrically conducting wires 18, respectively, and all of points 231 of the plurality of second point patterns 23 are located on a second straight line 84 perpendicular to a direction in which the plurality of second electrically conducting wires 18 extend.

In some embodiments of the present disclosure, referring to FIGS. 6 to 7, the second protective layer 19 is formed with a plurality of second holes 86, an orthogonal projection of each of the plurality of second holes 86 on the substrate 11 at least partially overlaps an orthogonal projection of two adjacent ones of the plurality of second point patterns 23 between two adjacent ones of the plurality of second electrically conducting wires 18 on the substrate 11, or at least partially overlaps an orthogonal projection of a connection part 87 (referring to FIG. 7) between the two adjacent second point patterns 23 on the substrate 11. The two adjacent second point patterns 23, or the connection part 87 between the two adjacent second point patterns 23 can be etched away by an etching solution through each of the plurality of second holes 86.

Since the second electrically conducting wires 18 probably have the same problem of the electrostatic discharge as the first electrically conducting wires 12, the second electrically conducting wires 18 and the second protective layer 19 may have the same structure as the first electrically conducting wires 12 and the first protective layer 15 to solve the problem of the electrostatic discharge. Thereby, the same effect can be achieved.

Figure 9:
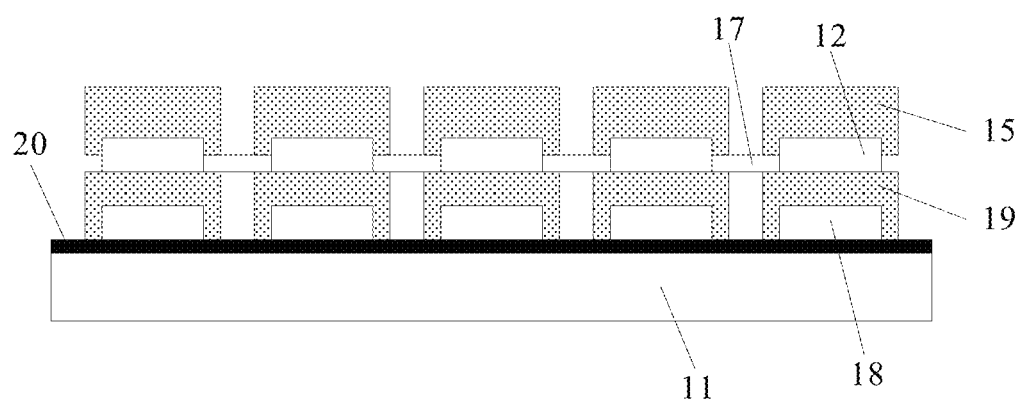
FIG. 9 is a schematic sectional view showing a structure of a touch display panel according to another embodiment of the present disclosure.
Figure 10:
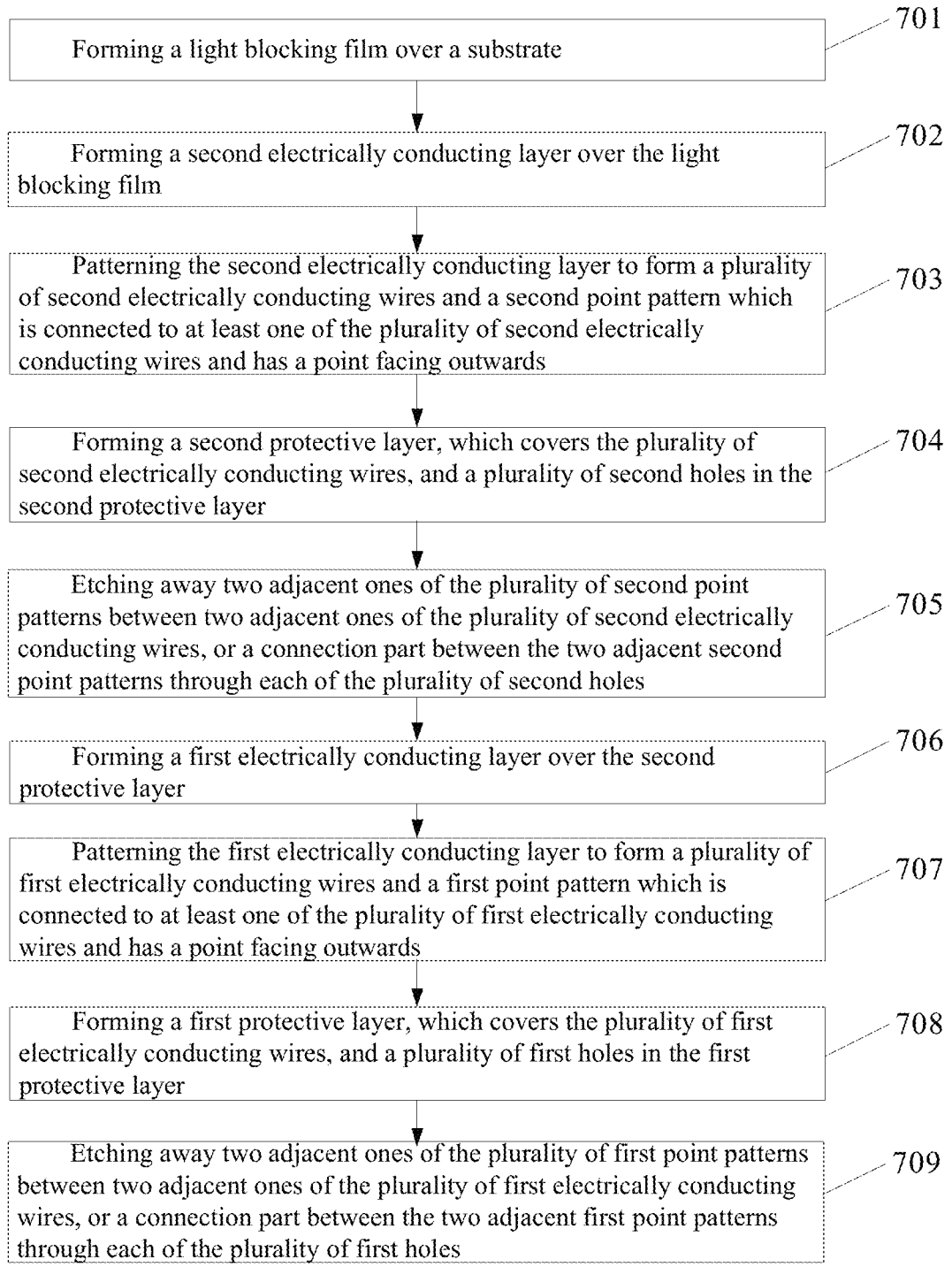
FIG. 10 is a flow diagram of a method of manufacturing the touch display panel according to an embodiment of the present disclosure.
Figure 11:
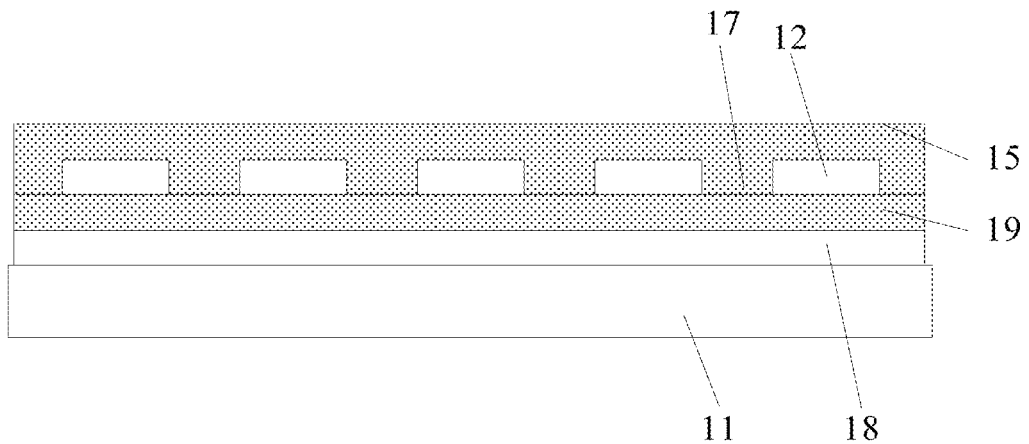
FIG. 11 is a schematic sectional view showing a structure of a touch display panel according to an embodiment of the present disclosure.

In some embodiments of the present disclosure, as shown in FIG. 9, the touch display panel may further include a light blocking film 20 disposed on the substrate 11 and located on a side of the plurality of second electrically conducting wires 18 facing away from the second protective layer 19.

Embodiments of the present disclosure provide a method of manufacturing the touch display panel according to any one of the above embodiments. The method includes: forming a first electrically conducting layer over the substrate; and patterning the first electrically conducting layer to form the plurality of first electrically conducting wires and the first point pattern which is connected to the at least one of the plurality of first electrically conducting wires and has the point facing outwards. The first electrically conducting layer may be made of a metal material. According to embodiments of the present disclosure, the plurality of first electrically conducting wires may be manufactured by a single patterning process or multiple patterning processes. The number of the patterning processes is not limited in the embodiments of the present disclosure.

In some embodiments of the present disclosure, the method further includes: forming a first protective layer, which covers the plurality of first electrically conducting wires, and a plurality of first holes in the first protective layer; and etching away two adjacent ones of the plurality of first point patterns between two adjacent ones of the plurality of first electrically conducting wires, or a connection part between the two adjacent first point patterns through each of the plurality of first holes.

In some embodiments of the present disclosure, the method further includes: prior to forming the first electrically conducting layer over the substrate, forming a second electrically conducting layer over the substrate, and patterning the second electrically conducting layer to form a plurality of second electrically conducting wires and the second point pattern which is connected to at least one of the plurality of second electrically conducting wires and has the point facing outwards.

In some embodiments of the present disclosure, the method further includes: forming a second protective layer, which covers the plurality of second electrically conducting wires, and a plurality of second holes in the second protective layer; and etching away two adjacent ones of the plurality of second point patterns between two adjacent ones of the plurality of second electrically conducting wires, or a connection part between the two adjacent second point patterns through each of the plurality of second holes.

Forming the first electrically conducting layer over the substrate specifically includes: forming the first electrically conducting layer over the second protective layer. In the embodiments, the plurality of second electrically conducting wires may be manufactured by a single patterning process or multiple patterning processes. The number of the patterning processes is not limited in the embodiments of the present disclosure.

In some embodiments of the present disclosure, the method further includes: forming a light blocking film over the substrate prior to forming the second electrically conducting layer over the substrate. Forming the second electrically conducting layer over the substrate specifically includes: forming the second electrically conducting layer over the light blocking film.

In some embodiments of the present disclosure, forming the first protective layer, which covers the plurality of first electrically conducting wires, and the plurality of first holes in the first protective layer includes: applying a first protective layer material; and exposing the applied first protective layer material while discharging the static electricity on the at least one of the plurality of first electrically conducting wires by the point discharge by the first point pattern, thereby forming the first protective layer and the plurality of first holes in the first protective layer.

In some embodiments of the present disclosure, forming the second protective layer, which covers the plurality of second electrically conducting wires, and the plurality of second holes in the second protective layer includes: applying a second protective layer material; and exposing the applied second protective layer material while discharging the static electricity on the at least one of the plurality of second electrically conducting wires by a point discharge by the second point pattern, thereby forming the second protective layer and the plurality of second holes in the second protective layer.

Embodiments of the present disclosure further provide a method of manufacturing the touch display panel. As shown in FIG. 7, the method includes:

a step 701 of forming a light blocking film over a substrate;

a step 702 of forming a second electrically conducting layer over the light blocking film;

a step 703 of patterning the second electrically conducting layer to form a plurality of second electrically conducting wires and a second point pattern which is connected to at least one of the plurality of second electrically conducting wires and has a point facing outwards;

a step 704 of forming a second protective layer, which covers the plurality of second electrically conducting wires, and a plurality of second holes in the second protective layer;

a step 705 of etching away two adjacent ones of the plurality of second point patterns between two adjacent ones of the plurality of second electrically conducting wires, or a connection part between the two adjacent second point patterns through each of the plurality of second holes;

a step 706 of forming a first electrically conducting layer over the second protective layer;

a step 707 of patterning the first electrically conducting layer to form a plurality of first electrically conducting wires and a first point pattern which is connected to at least one of the plurality of first electrically conducting wires and has a point facing outwards;

a step 708 of forming a first protective layer, which covers the plurality of first electrically conducting wires, and a plurality of first holes in the first protective layer; and a step 709 of etching away two adjacent ones of the plurality of first point patterns between two adjacent ones of the plurality of first electrically conducting wires, or a connection part between the two adjacent first point patterns through each of the plurality of first holes.

The description of the structures of the touch display panel may be referred to for the steps of the method of manufacturing the touch display panel and the steps of the method are no longer further described for the sake of brevity.

Embodiments of the present disclosure further provide a display apparatus including the touch display panel according to any one of the above embodiments. In the touch display panel according to the embodiments of the present disclosure, the first point pattern is connected to the first electrically conducting wire such that the electrostatic discharge of the first electrically conducting wire is achieved by the point discharge of the first point pattern. Since the first point pattern is fixed in position, the electrostatic discharge of the first electrically conducting wire will take place at a fixed position, avoiding an adverse influence of the electrostatic discharge at a random position on a key structure of the touch display panel, and thus increasing a yield of the touch display panel.

As described above, with the touch display panel, the method of manufacturing the touch display panel, and the display apparatus with the touch display panel according to the embodiments of the present disclosure, the touch display panel includes a substrate; a plurality of first electrically conducting wires disposed over the substrate; and a first point pattern which is connected to at least one of the plurality of first electrically conducting wires, has a point facing outwards, and is configured to discharge a static electricity on the at least one of the plurality of first electrically conducting wires by a point discharge. In the touch display panel according to the embodiments of the present disclosure, the first point pattern is connected to the first electrically conducting wire such that the electrostatic discharge of the first electrically conducting wire is achieved by the point discharge of the first point pattern. Since the first point pattern is fixed in position, the electrostatic discharge of the first electrically conducting wire will take place at a fixed position, avoiding an adverse influence of the electrostatic discharge at a random position on a key structure of the touch display panel, and thus increasing a yield of the touch display panel.

Although some exemplary embodiments of the present disclosure have been shown and described above, it would be appreciated by a person skilled in the art that many modifications or changes may be made therein without departing from the principle and spirit of the present disclosure, the scope of which is defined in the appended claims and their equivalents.

What is claimed is:

1. A touch display panel comprising:
a substrate;
a plurality of first electrically conducting wires disposed over the substrate;
a plurality of first point patterns, wherein two of the plurality of first point patterns are connected to opposite sides of each of the plurality of first electrically conducting wires, respectively, each of the plurality of first point patterns has a point facing outwards, and the plurality of first point patterns are configured to discharge a static electricity on at least one of the plurality of first electrically conducting wires by a point discharge; and a first protective layer covering the plurality of first electrically conducting wires and formed with a plurality of first holes, wherein an orthogonal projection of each of the plurality of first holes on the substrate at least partially overlaps an orthogonal projection of two adjacent ones of the plurality of first point patterns between two adjacent ones of the plurality of first electrically conducting wires on the substrate, or an orthogonal projection of a connection part between the two adjacent first point patterns on the substrate, such that two adjacent ones of the plurality of first point patterns between two adjacent ones of the plurality of first electrically conducting wires, or the connection part between the two adjacent first point patterns, can be etched away through each of the plurality of first holes.

2. The touch display panel of claim 1, wherein:
all points of the plurality of first point patterns are located on a first straight line perpendicular to a direction in which the plurality of first electrically conducting wires extend.

3. The touch display panel of claim 1, further comprising:
a plurality of second electrically conducting wires disposed over the substrate;
a second protective layer covering the plurality of second electrically conducting wires, wherein the plurality of first electrically conducting wires and the plurality of second electrically conducting wires are located on opposite sides of the second protective layer, respectively; and
a second point pattern which is connected to at least one of the plurality of second electrically conducting wires, has a point facing outwards, and is configured to discharge a static electricity on the at least one of the plurality of second electrically conducting wires by a point discharge.

4. The touch display panel of claim 3, wherein:
the touch display panel comprises a plurality of the second point patterns, two of the plurality of second point patterns are connected to opposite sides of each of the plurality of second electrically conducting wires, respectively, and all points of the plurality of second point patterns are located on a second straight line perpendicular to a direction in which the plurality of second electrically conducting wires extend.

5. The touch display panel of claim 4, wherein:
the second protective layer is formed with a plurality of second holes, wherein an orthogonal projection of each of the plurality of second holes on the substrate at least partially overlaps an orthogonal projection of two adjacent ones of the plurality of second point patterns between two adjacent ones of the plurality of second electrically conducting wires on the substrate, or an orthogonal projection of a connection part between the two adjacent second point patterns on the substrate, to etch away two adjacent ones of the plurality of second point patterns between two adjacent ones of the plurality of second electrically conducting wires, or a connection part between the two adjacent second point patterns through each of the plurality of second holes.

6. The touch display panel of claim 3, wherein:
the second point pattern has a triangular shape.

7. The touch display panel of claim 3, further comprising:
a light blocking film disposed over the substrate and located on a side of the plurality of second electrically conducting wires facing away from the second protective layer.

8. The touch display panel of claim 1, wherein:
each of the plurality of first electrically conducting wires comprises a bonding end, a connection portion connected with the bonding end, a body perpendicular to the connection portion, and a bent portion connecting the connection portion and the body, and the plurality of first point patterns are connected to ends of the body adjacent to the bonding ends.

9. The touch display panel of claim 1, wherein:
the first point pattern has a triangular shape.

10. The touch display panel of claim 1, wherein:
each of the plurality of first electrically conducting wires comprises a bonding end, a connection portion connected with the bonding end, a body perpendicular to the connection portion, and a bent portion connecting the connection portion and the body, and the plurality of first point patterns are connected to ends of the body adjacent to the bonding ends, and
the plurality of first holes comprise rectangular holes each having a pair of side walls parallel to a respective body.

11. A display apparatus comprising the touch display panel of claim 1.

12. A method of manufacturing a touch display panel, the method comprising:
providing a substrate;
forming a first electrically conducting layer over the substrate;
patterning the first electrically conducting layer to form a plurality of first electrically conducting wires and a plurality of first point patterns, wherein two of the plurality of first point patterns are connected to opposite sides of each of the plurality of first electrically conducting wires, respectively, each of the plurality of first point patterns has a point facing outwards, and the plurality of first point patterns are configured to discharge a static electricity on at least one of the plurality of first electrically conducting wires by a point discharge;
forming a first protective layer, which covers the plurality of first electrically conducting wires, and a plurality of first holes in the first protective layer; and
etching away two adjacent ones of the plurality of first point patterns between two adjacent ones of the plurality of first electrically conducting wires, or etching away a connection part between the two adjacent first point patterns through each of the plurality of first holes.

13. The method of claim 12, further comprising:
prior to forming the first electrically conducting layer over the substrate, forming a second electrically conducting layer over the substrate, and patterning the second electrically conducting layer to form a plurality of second electrically conducting wires and a second point pattern which is connected to at least one of the plurality of second electrically conducting wires and has a point facing outwards.

14. The method of claim 13, wherein the step of patterning the second electrically conducting layer comprises forming a plurality of second point patterns, and further comprising:
forming a second protective layer, which covers the plurality of second electrically conducting wires, and a plurality of second holes in the second protective layer; and
etching away two adjacent ones of the plurality of second point patterns between two adjacent ones of the plurality of second electrically conducting wires, or a connection part between the two adjacent second point patterns through each of the plurality of second holes, wherein forming the first electrically conducting layer over the substrate comprises:

forming the first electrically conducting layer over the second protective layer.

15. The method of claim 14, further comprising:

forming a light blocking film over the substrate prior to forming the second electrically conducting layer over the substrate, wherein forming the second electrically conducting layer over the substrate comprises:

forming the second electrically conducting layer over the light blocking film.

16. The method of claim 14, wherein forming the second protective layer, which covers the plurality of second electrically conducting wires, and the plurality of second holes in the second protective layer comprises:

applying a second protective layer material; and exposing the applied second protective layer material while discharging the static electricity on the at least one of the plurality of second electrically conducting wires by a point discharge by the second point patterns, thereby forming the second protective layer and the plurality of second holes in the second protective layer.

17. The method of claim 12, wherein forming the first protective layer, which covers the plurality of first electrically conducting wires, and the plurality of first holes in the first protective layer comprises:

applying a first protective layer material; and exposing the applied first protective layer material while discharging the static electricity on the at least one of the plurality of first electrically conducting wires by the point discharge by the first point patterns, thereby forming the first protective layer and the plurality of first holes in the first protective layer.

18. The method of claim 12, wherein:

each of the plurality of first electrically conducting wires comprises a bonding end, a connection portion connected with the bonding end, a body perpendicular to the connection portion, and a bent portion connecting the connection portion and the body, and the plurality of first point patterns are connected to ends of the body adjacent to the bonding ends, and the plurality of first holes comprise rectangular holes each having a pair of side walls parallel to a respective body.

* * * * *